May 28, 1935.  A. KINDELMANN ET AL  2,002,538
SUPPORTING PEDESTAL
Filed July 30, 1932   2 Sheets-Sheet 1
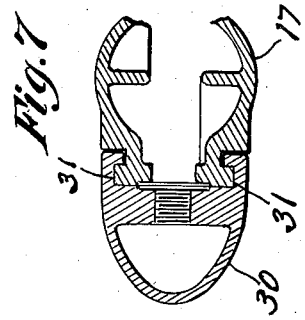
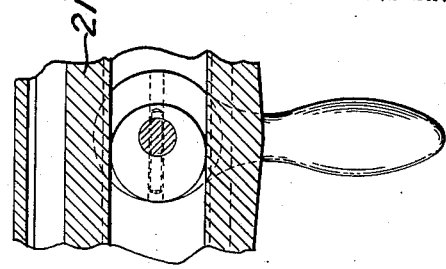
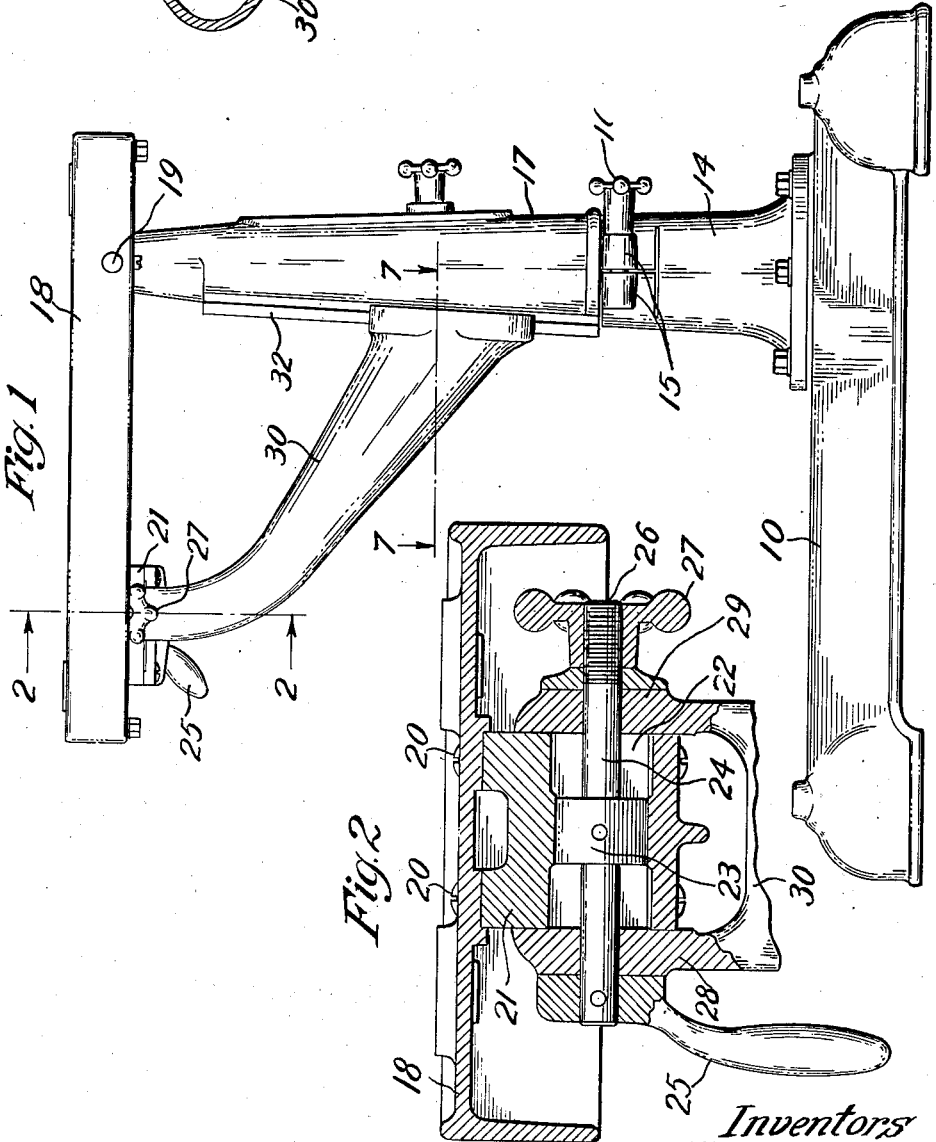
Inventors
Albert Kindelmann
Charles L. Ragot
by Austin & Dry
Attorneys

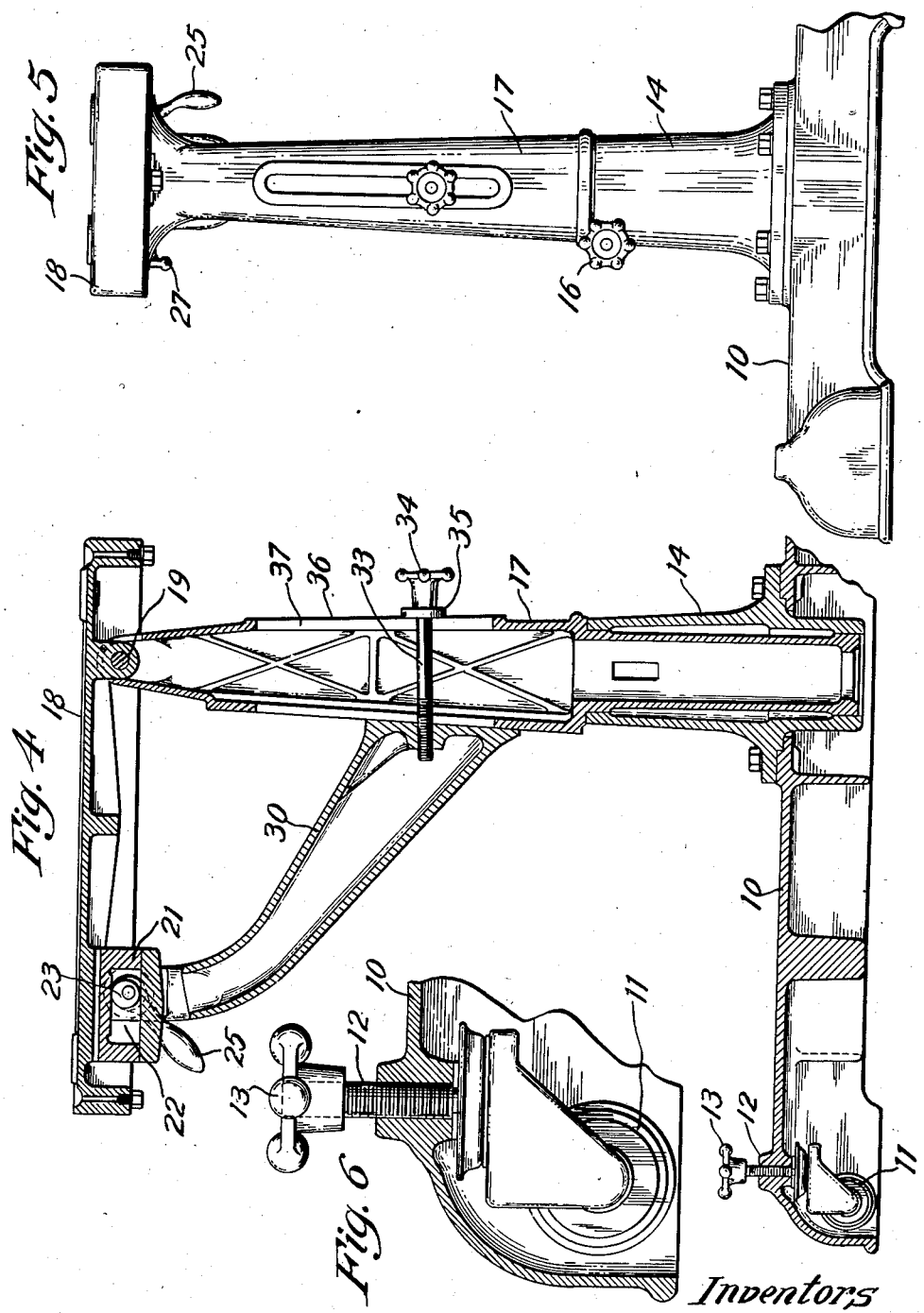

Patented May 28, 1935

2,002,538

UNITED STATES PATENT OFFICE 2,002,538

SUPPORTING PEDESTAL

Albert Kindelmann, Floral Park, and Charles L. Ragot, New York, N. Y., assignors to International Projector Corporation, New York, N. Y., a corporation of Delaware Application July 30, 1932, Serial No. 626,580

8 Claims. (Cl. 248—41)

This invention relates to new and useful improvements in supporting pedestals and particularly it refers to motion picture apparatus such as motion picture projectors.

The invention provides an improved supporting pedestal with novel adjustment mechanism that will permit the base plate which in the preferred use supports a motion picture projector head and lamp house, to be quickly adjusted with precision to the proper angle of projection.

The invention further provides a novel mechanism which will permit an initial coarse adjustment followed by a finer micrometer adjustment.

The invention also provides an improved structure on which the whole pedestal and base plate may readily be adjusted as above mentioned while being capable of quick setting around a vertical axis.

The invention contemplates a tapered or bevelled support for a moving element of the adjustment which will permit very easy adjustment of the whole load while on the base plate merely by slowly loosening a clamping screw.

Further and more specific features and advantages will more clearly appear from a consideration of the specification hereinafter taken in connection with the accompanying drawings which form part of the specification and which illustrate a present preferred form of the invention.

The invention briefly comprises a base on which is mounted a vertical hollow column. In this hollow column is disposed a supporting pedestal capable of rotation around a vertical axis and clamped by any usual arrangement. At the top of the pedestal is pivoted one end of a projector base plate. The other end of the base plate is connected by a cam mechanism to a single arm which extends to the lower portion of the pedestal and is constructed to cooperate therewith by means of a tongue and groove arrangement. The lower end of the arm is engaged by a clamping screw arm slidable up and down in a slot formed in the pedestal. There is a slight divergence between the surface of the slot and the sliding tongue and groove construction and this divergence is downward so that as the clamping screw is slightly released the arm slides downward a little until the divergence locks it tight. Thus the arm may be slowly lowered by degrees thus forming a relatively coarse adjustment while the whole load is on the base plate. After the coarse adjustment is made then the cam at the rear end of the base plate can be adjusted to give a final fine adjustment to the plate.

This invention is illustrated in the drawings, of which:

Fig. 1 is a side elevation of the device;

Fig. 2 is a cross section on the line 2—2 of Fig. 1;

Fig. 3 is a detail section showing the fine adjustment cam;

Fig. 4 is a vertical section through the device;

Fig. 5 is an end elevation of the device;

Fig. 6 is a detail section showing the casters on the bottom plate; and

Fig. 7 is a section through line 7—7 of Fig. 1.

As shown in the drawings, the present preferred form of the invention comprises a base 10 preferably triangular in general shape and provided with casters 11 in each corner. Casters 11 are on threaded rods 12 adjustable by means of hand wheels 13 to vary the height of base 10 from the floor.

On this base 10 is fixed a column 14, preferably hollow, and having the usual split ring upper end 15 and clamping screw 16. Within column 14 is disposed a pedestal member 17 adapted for rotation in the column 14 around a vertical axis and adjusted in any desired position by means of screw 16 so as to determine the lateral direction of the projection beam of a motion picture projection machine which is the product most generally used on this improved pedestal.

At the upper end of pedestal 17 the projector base plate 18 is pivoted as at 19. At the rear end of plate 18 there is dependently supported by screws 20, a cross head piece 21 with a longitudinal slot 22 therein. A cam disk 23 is disposed in slot 22 and mounted on shaft 24 having a handle 25 on one end and a threaded portion 26 at the other end with a hand wheel 27. The shaft 24 is journalled in side arms 28 and 29 at the upper end of a single stiff arm 30 which is the main adjusting arm for the base plate 18.

This arm 30 extends downwardly towards the pedestal 17. This arm 30 has grooves 31 therein with which cooperates tongues 32 on the rear side edges of pedestal member 17. A threaded clamping rod 33 extends from arm 30 through the slot 37 in pedestal 17 and has a hand wheel 34 on the other end with shoulder 35 bearing against the smooth surfaces 36 at the front of pedestal 17. The slope of surfaces 36 and tongues 32 preferably diverge downwardly as shown in Fig. 1.

It will be noted that with a full head load on base plate 18, the operator can slightly loosen hand wheel 34 which will permit the lower end of arm 30 to slide down tongues 32 a little bit until the divergence of the surfaces above mentioned causes a jamming or wedging action between the hand wheel 34 and the lower end of the arm 30. If this relatively coarse adjustment is not enough the wheel 34 may be loosened a little more. After a rough adjustment is achieved then the wheel 27 is loosened and the handle 25 turned to adjust cam 23 which will raise or lower rear end of base plate 18 to desired fine and final degree. The wheel 27 is then tightened to fasten the cam in position.

In summation, it will be observed that the action of loosening wheel 34 above described permits quick and ready controlled coarse adjustment no matter how much load is on the plate 18. The final adjustment is by means of cam 23. The stiff arm 30 of uniform fixed length gives accuracy and simplicity to the construction as well as rigidity and freedom from vibration. The diverging surfaces on the sides of the pedestal give automatic and gradual wedging as clamping screw is released, independent of load on base plate. Swivel of pedestal gives quick horizontal adjustment. Therefore, the weight of the head to adjust it vertically is taken off the operator in this adjustment and instead the operator only has to control and not support any particular weight. The device is simple, efficient, accurate and permits quick and easy adjustment by operator and is rigid and vibrationless.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. A pedestal construction which comprises a column, an arm slidably connected thereto and extending away therefrom, a device for clamping the arm to the column element, and means for causing the clamping device, when loosened, to move by gravity to a new position and to be locked therein automatically, the amount of movement being proportionate to the amount the device is loosened.

2. A pedestal construction which comprises a column having downwardly diverging front and rear surfaces, an arm engaging and being slidable along one surface, and a clamping screw connected to the arm and engaging the other surface.

3. A pedestal construction for motion picture projectors which comprises a column having downwardly diverging front and rear surfaces, an arm engaging and slidable along one surface, a clamping screw connected to the arm and engaging the other surface, a base plate pivoted at one end to the top of the column, and a cam device connecting the other end of the arm and the other end of the base plate.

4. A pedestal construction for motion picture projectors which comprises a base, a fixed column thereon, a movable column swivelled on the fixed column, a base plate pivoted at one end to the top of the movable column, an arm extending from said movable column to the other end of said base plate, a clamping screw connecting said arm to the movable column, and wedging means on the movable column causing automatic adjustment of the arm in a new lower position relative to the movable column as the screw is loosened and gravity causes the arm to drop, the location of the new arm position relative to the old position being determined by the amount the screw is loosened.

5. A pedestal construction for motion picture projectors which comprises a base, a fixed column thereon, a movable column swivelled on said fixed column, a base plate pivoted at one end to the top of the movable column, an arm extending from said movable column to the other end of said base plate, a clamping screw connecting said arm to the movable column, wedging means on the movable column causing automatic adjustment of the arm in a new lower position relative to the movable column as the screw is loosened and gravity causes the arm to drop, the location of the new arm position relative to the old position being determined by the amount the screw is loosened, and a cam connecting the other end of the arm to the other end of the base plate for finer adjustments.

6. A pedestal construction for motion picture projectors which comprises a base plate, a column for supporting said base plate, said base plate being pivotally connected at one end to the aforementioned supporting column, an arm extending from said column to the other end of the base plate, a slotted member on the plate, a cam mounted in said slot, means supporting the cam and mounted on the end of said arm, means for turning the cam to adjust the end of the plate around its pivot point, said column having downwardly diverging front and rear surfaces, and clamping means connected to the arm and engaging said divergent surfaces, the loosening of the clamping means causing a gravity drop of the arm along the column proportionate to the amount the clamping means is released.

7. A pedestal construction for motion picture projectors which comprises a column having front and rear downwardly divergent surfaces, a base plate pivotally connected to the upper end of the column, a single rigid arm extending from the column to the free end of the base plate, one end of the arm and the adjacent surface of the column having a cooperating tongue-and-groove to permit relative sliding movement therebetween, and adjustable means causing a predetermined amount of downward sliding movement of the arm along the column proportionate to the amount the adjustable means is released.

8. A pedestal construction for motion picture projectors which comprises a column having front and rear downwardly divergent surfaces, a base plate pivotally connected to the upper end of the column, a single rigid arm extending from the column to the free end of the base plate, one end of the arm and the adjacent surface of the column having a cooperating tongue-and-groove to permit relative sliding movement therebetween, and adjustable means causing a predetermined amount of downward sliding movement of the arm along the column proportionate to the amount the adjustable means is released, the slope of the cooperating tongue-and-groove being downwardly divergent with respect to the vertical axis of the column.

ALBERT KINDELMANN.
CHAS. L. RAGOT.